July 26, 1949.
C. W. ALLEN
2,477,159
MILLING MACHINE
Filed Aug. 17, 1945
8 Sheets-Sheet 1
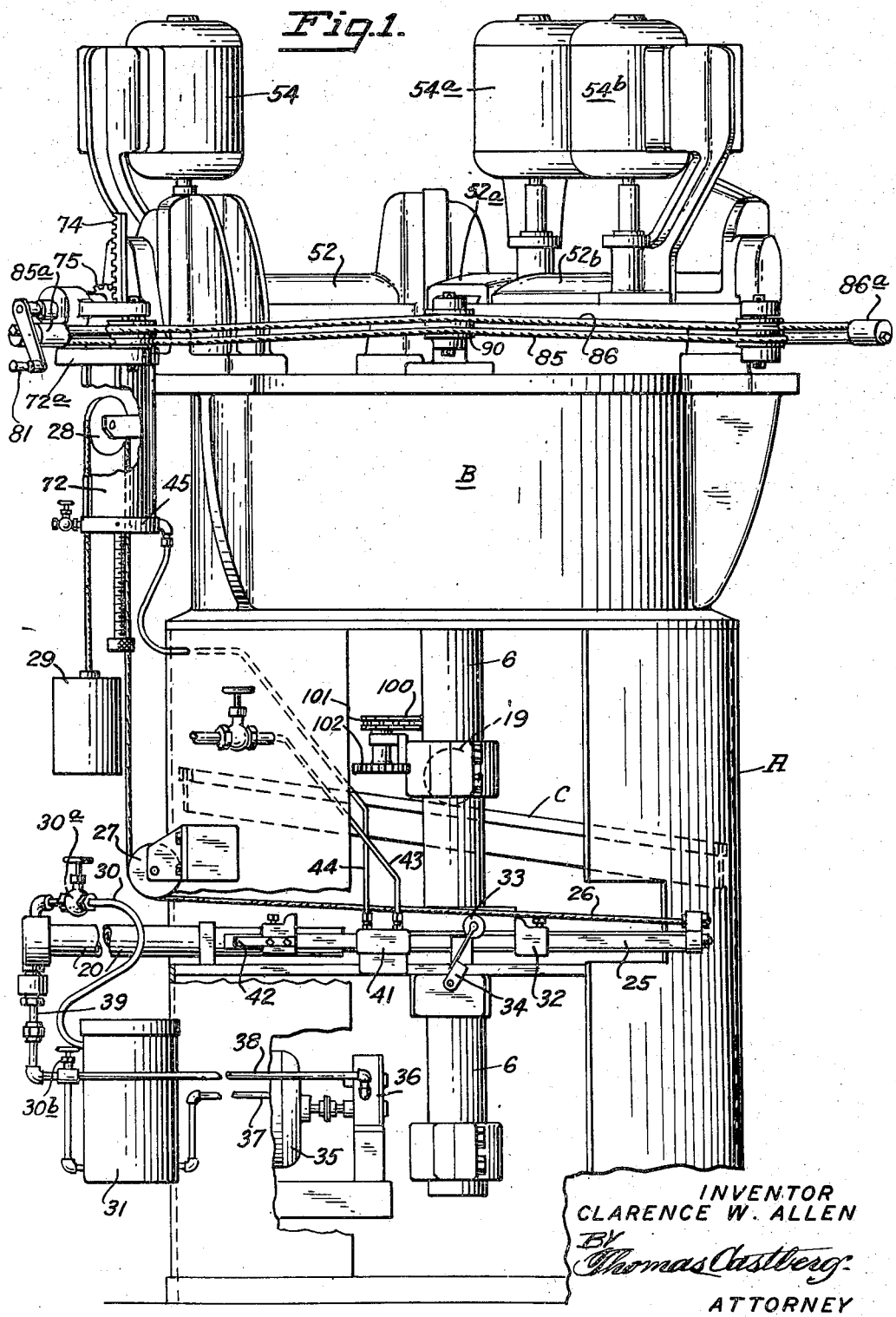
INVENTOR
CLARENCE W. ALLEN
By Thomas Castberg
ATTORNEY

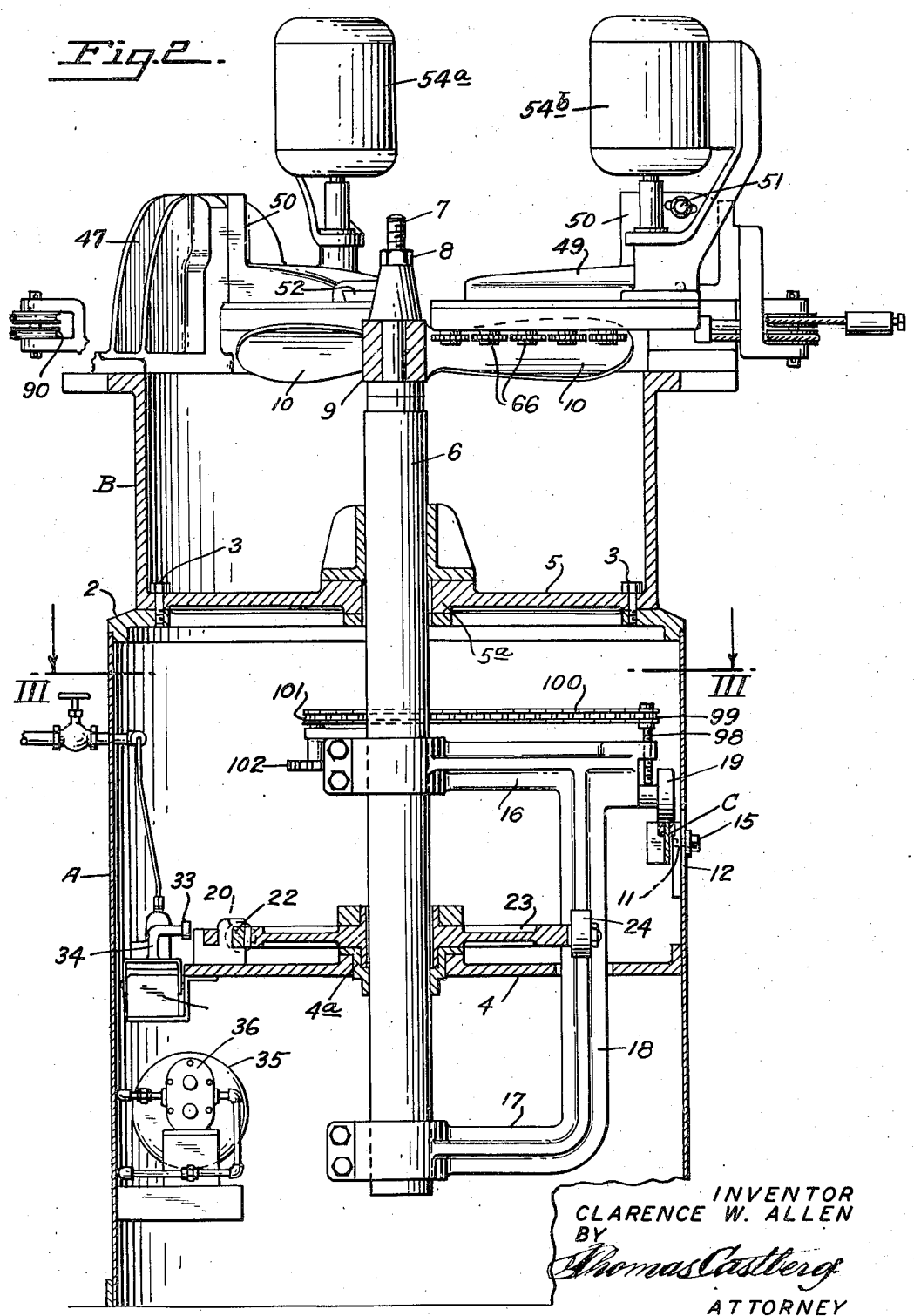

July 26, 1949.  C. W. ALLEN  2,477,159
MILLING MACHINE
Filed Aug. 17, 1945  8 Sheets-Sheet 3
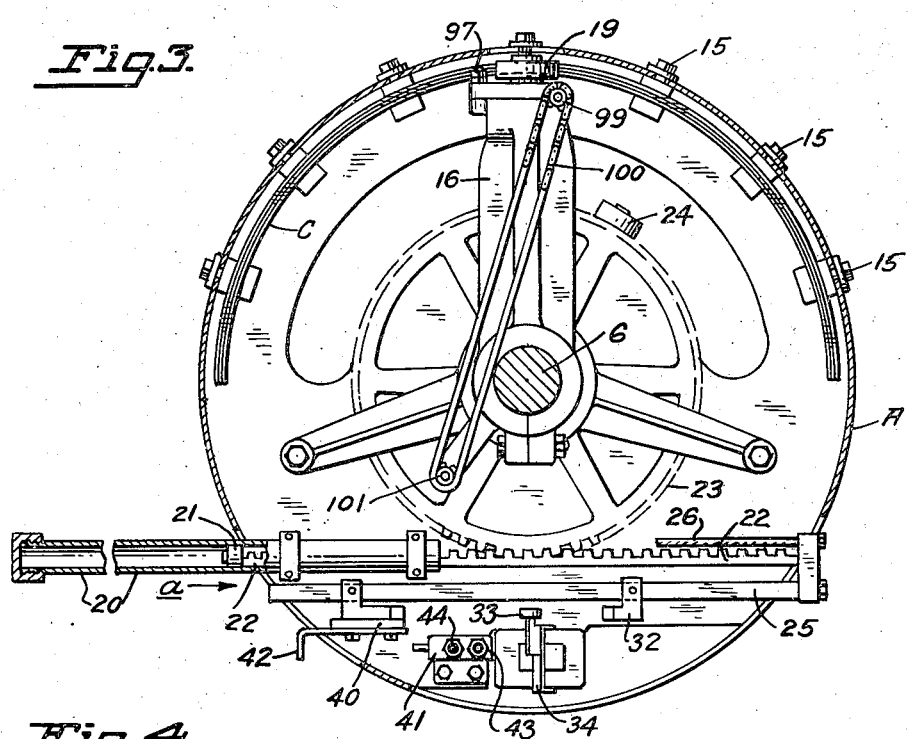
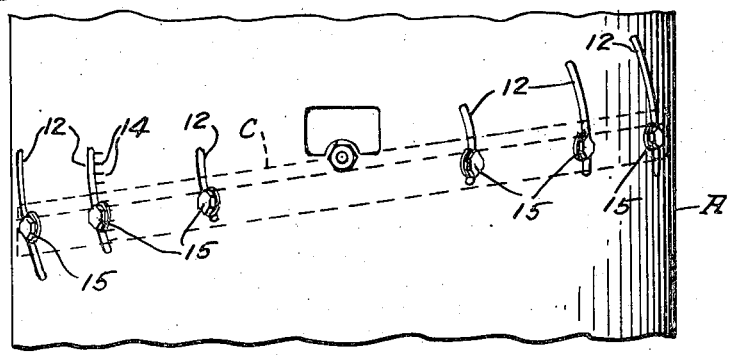
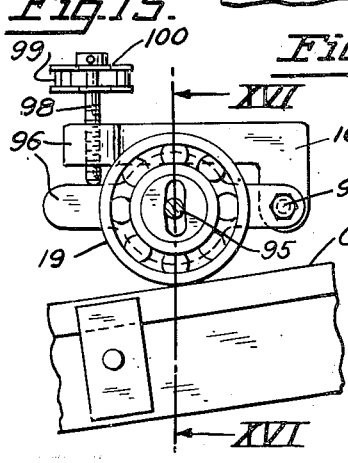
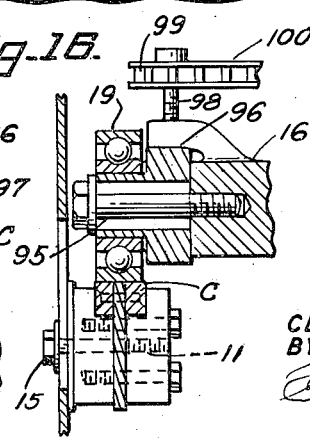
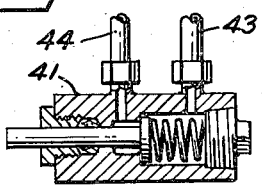
INVENTOR
CLARENCE W. ALLEN
BY
Thomas Castberg
ATTORNEY

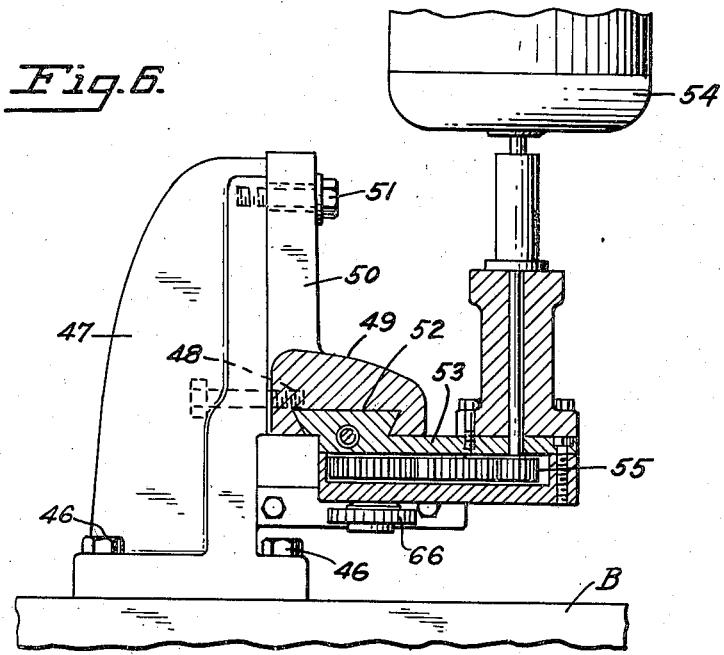
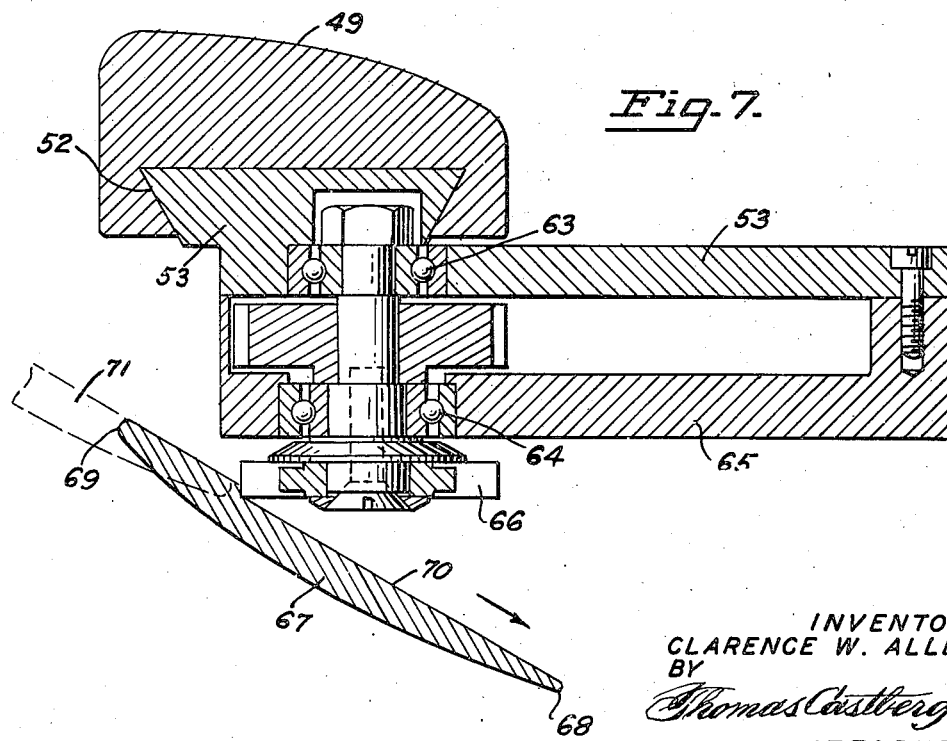

July 26, 1949.  C. W. ALLEN  2,477,159
MILLING MACHINE

Filed Aug. 17, 1945  8 Sheets-Sheet 5

INVENTOR
CLARENCE W. ALLEN
BY
Thomas Castberg
ATTORNEY

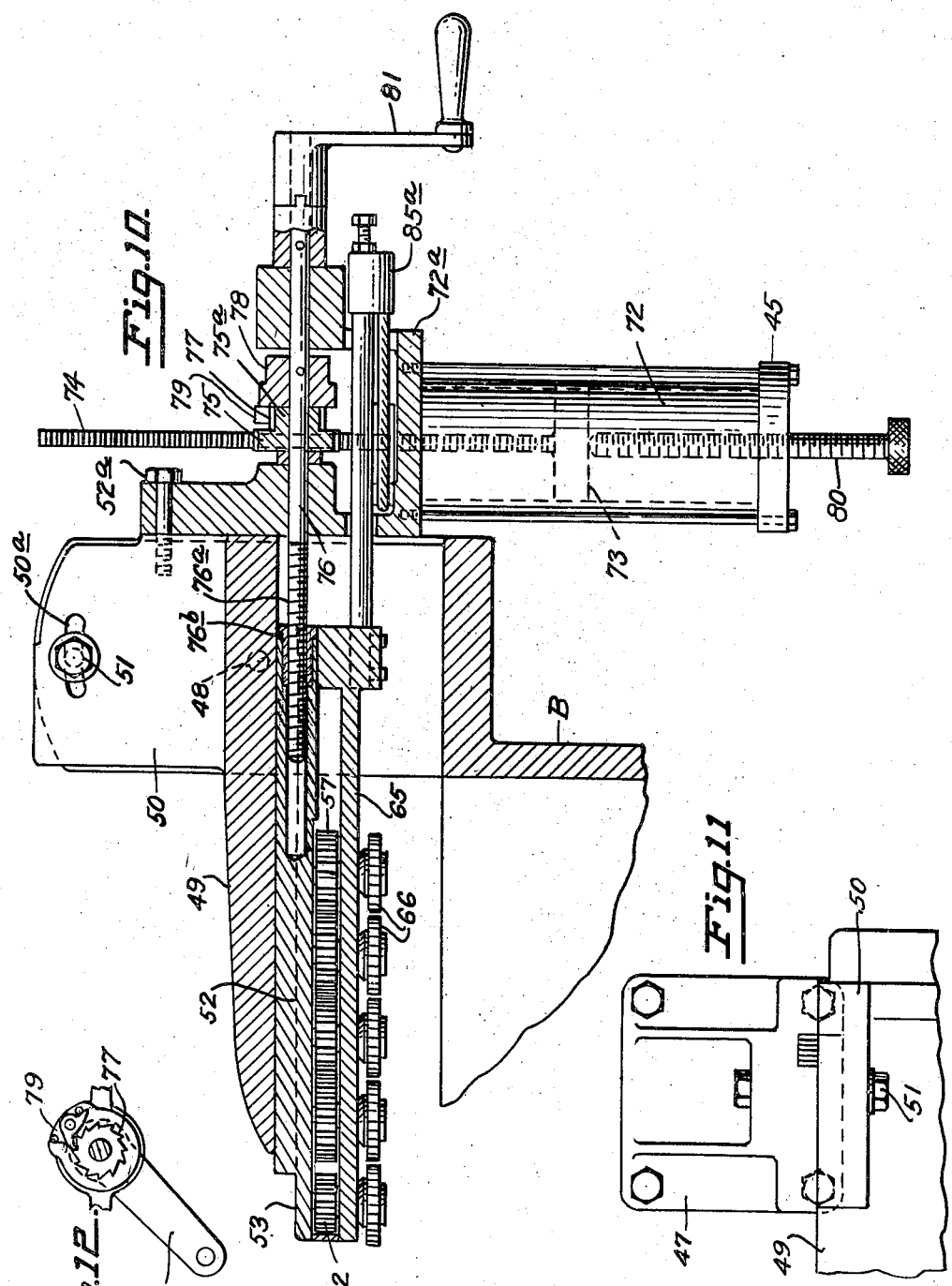

July 26, 1949.   C. W. ALLEN   2,477,159
MILLING MACHINE

Filed Aug. 17, 1945   8 Sheets-Sheet 7

INVENTOR
CLARENCE W. ALLEN
BY
Thomas Castberg
ATTORNEY

July 26, 1949.　　　　C. W. ALLEN　　　　2,477,159
MILLING MACHINE
Filed Aug. 17, 1945　　　　　　　　　　　　8 Sheets-Sheet 8
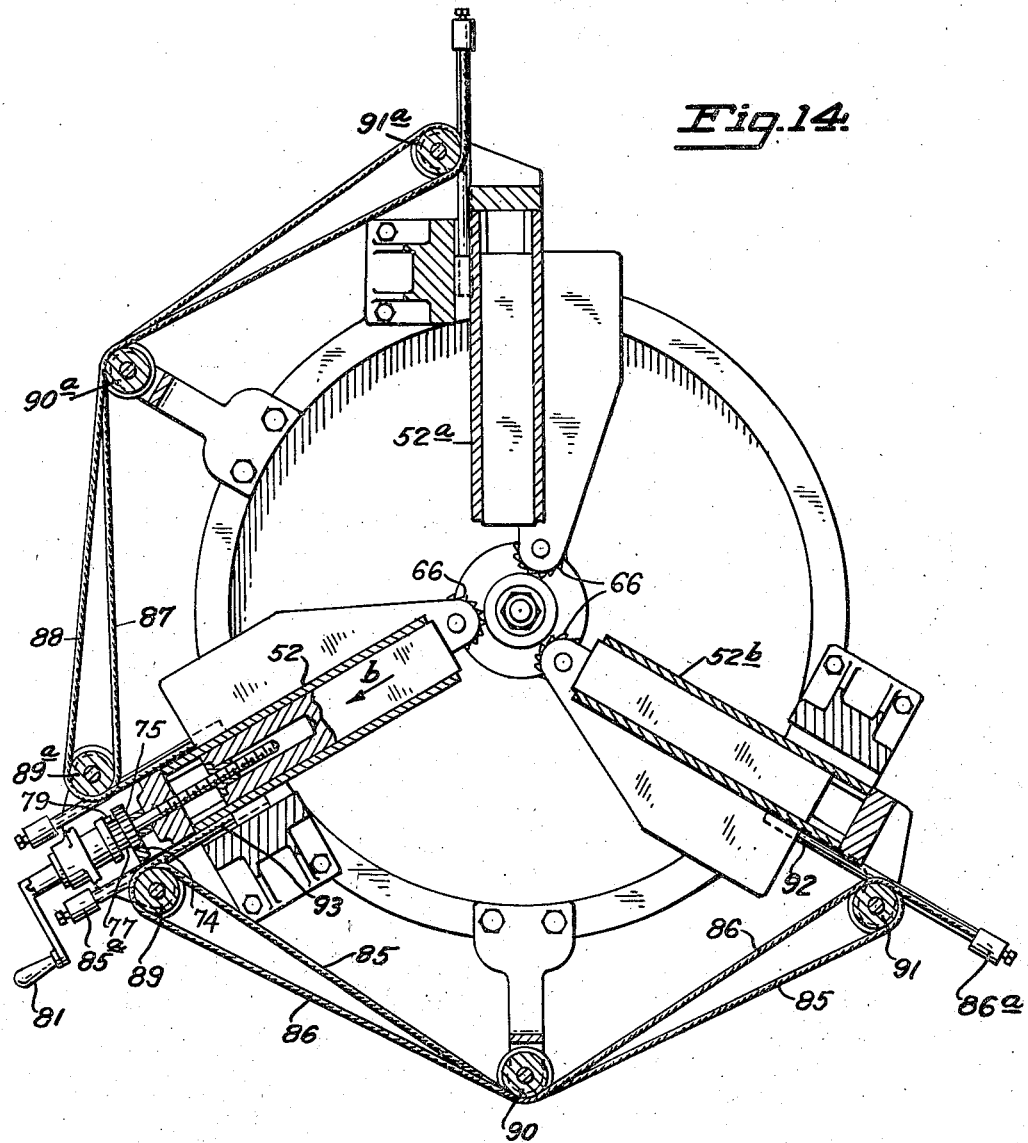
INVENTOR
CLARENCE W. ALLEN
BY
Thomas Ostberg
ATTORNEY Patented July 26, 1949

2,477,159

UNITED STATES PATENT OFFICE 2,477,159

MILLING MACHINE

Clarence W. Allen, San Francisco, Calif.

Application August 17, 1945, Serial No. 611,209

16 Claims. (Cl. 90—13.7)

This invention relates to a milling machine especially designed to mill and finish the pressure surface of propeller blades.

In the manufacture of multi-blade marine propellers particularly after the casting has been made, it is essential if the highest propeller efficiency is to be obtained, that the pressure side of each blade be smooth and finished and that each of said surfaces be identical in pitch from the tip of each blade to the hub, and that the angle presented by each blade which is the least at the tip and increases towards the hub be identical at all distances from the hub towards the tips.

The object of the present invention is to provide a milling machine which will mill to a substantially finished surface the entire pressure surface of a propeller blade from the tip to the hub and also the fillet between the blade and the hub; to provide a milling machine which will mill two or more blade surfaces simultaneously and insure that two or more surfaces will be identical; to provide a milling machine having a plurality of cooperating cutters arranged in line formation and all driven in unison to cut crosswise of a propeller blade; to provide an adjustable support for receiving and securing the propeller with a leading edge of a blade in substantial alignment with a plurality of aligned milling cutters; to provide means for rotating the propeller support and propeller blade about its axis of rotation in a direction towards the milling cutters and at the same time cause the support and propeller to move vertically in a downward direction whereby the combined downward and rotational movement will equal the pitch of the blade or blades to be milled and thereby cause the milling cutters to cut a plurality of grooves crosswise of a blade with the bottom of the grooves presenting a true pitch surface; to provide means for reversing rotation and vertical movement of a propeller and support to return a blade or blades to a position for a second cut; to provide means for manually or automatically advancing the plural milling cutters a predetermined distance towards the tip of the blade to form a series of overlapping cuts; and, to provide means for automatically repeating said operations until an entire blade or a plurality of blade surfaces have been mill finished to a true pitch surface.

The milling machine is shown by way of illustration in the accompanying drawings in which:

Fig. 1 is a front elevation of the milling machine partially broken away;

Fig. 2 is a central vertical section of the milling machine;

Fig. 3 is a cross section taken on line III—III of Fig. 2;

Fig. 4 is a rear elevation of a portion of the lower base section of the milling machine;

Fig. 5 is an enlarged central vertical section of the air valve 41;

Fig. 6 is a cross section of arm 49 showing the driving connection between the gears and the electric motor;

Fig. 7 is a similar section but enlarged and showing one of the milling cutters in cutting position with relation to a propeller blade;

Figure 8:
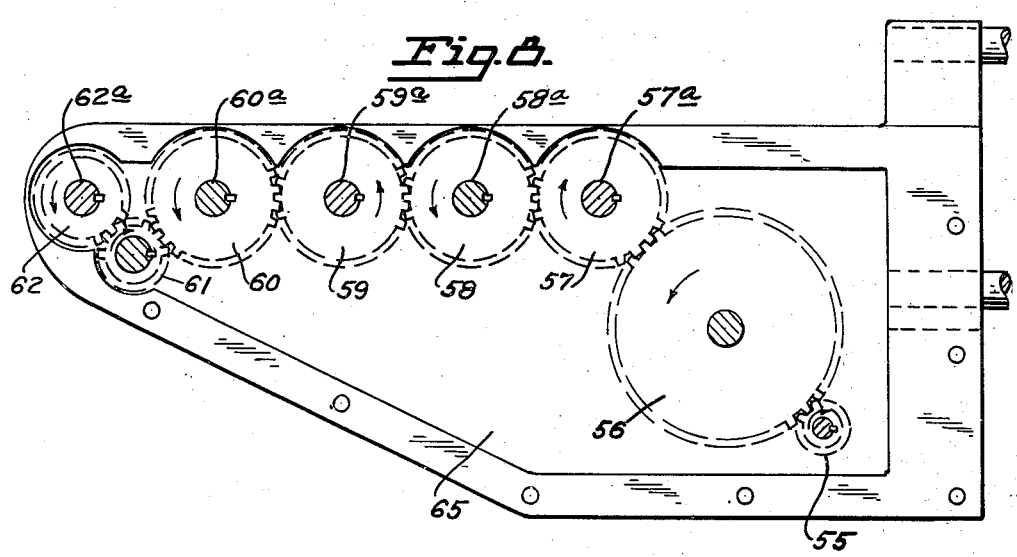
Fig. 8 is an enlarged plan view of the head member 53 showing the cover removed.
Figure 9:
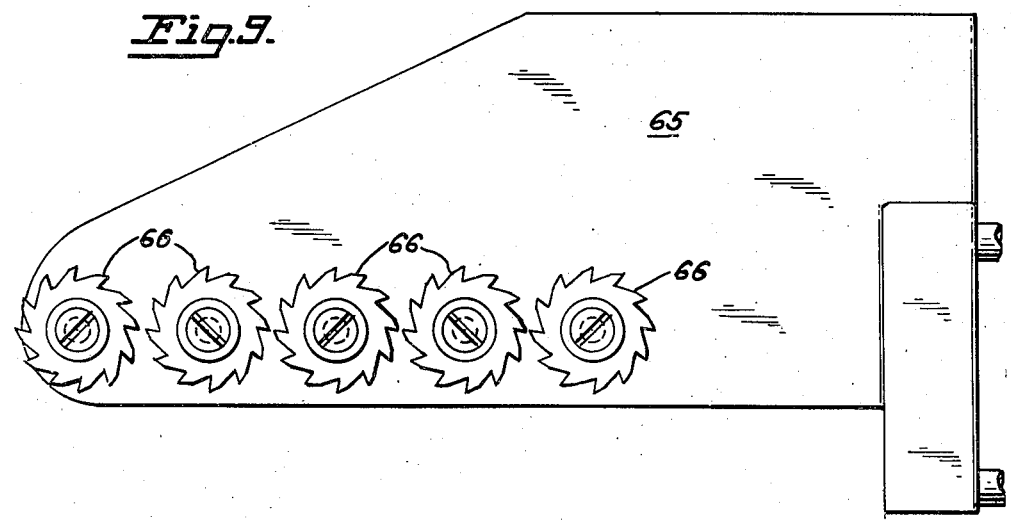
Fig. 9 is a bottom section of the head member.
Figure 13:
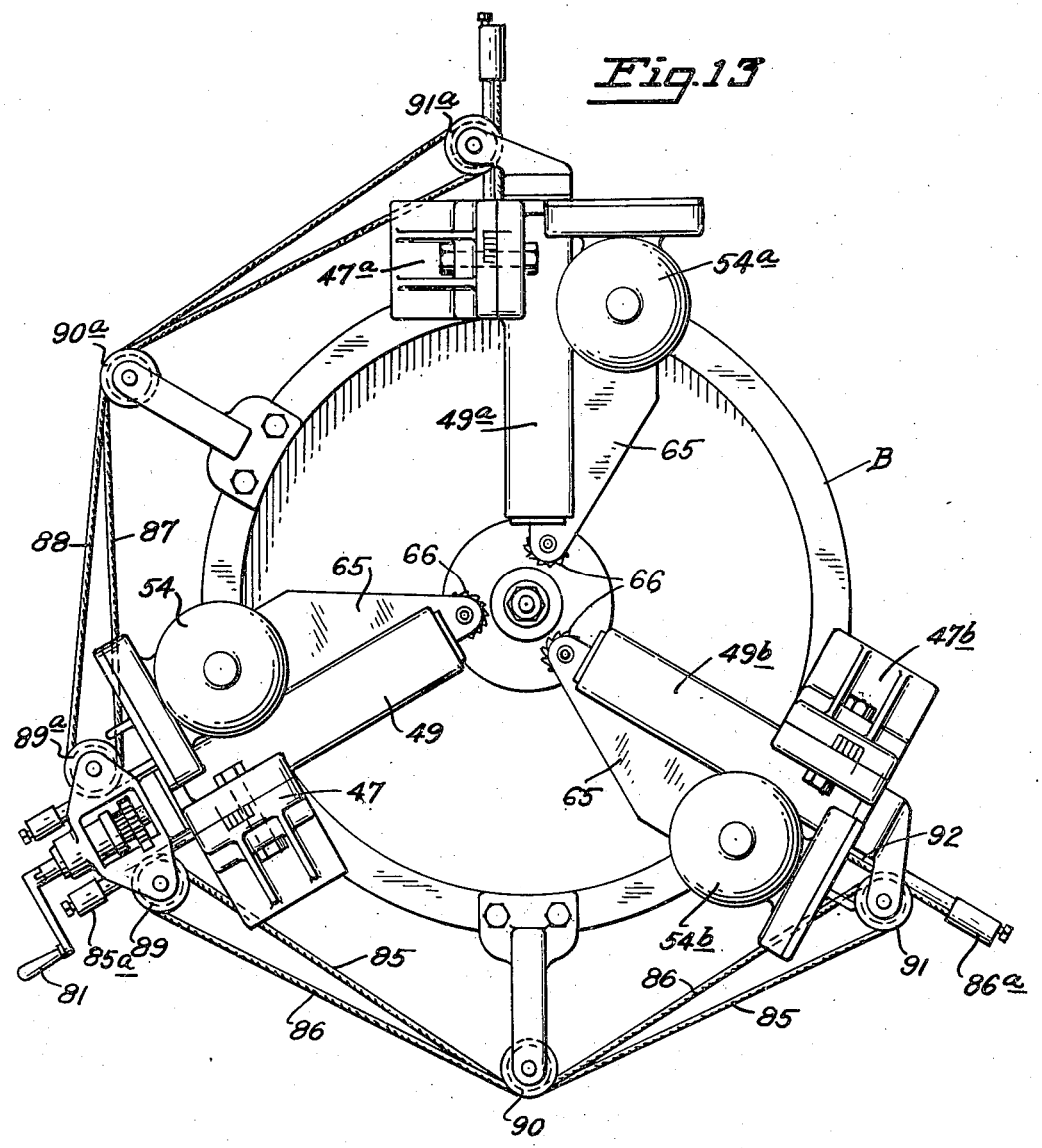

Fig. 10 is a longitudinal section of the arm 49 and the head member 53 showing the manner in which the hydraulic actuated piston 73 transmits rotary motion to the screw rod 76;

Fig. 11 is a plan view of one of the brackets 47 showing the manner in which the arm 49 is pivotally attached thereto;

Fig. 12 is a detailed view of the pawl and ratchet mechanism indicated by the numerals 77 and 79;

Fig. 13 is a plan view of the machine;

Fig. 14 is a plan view in section of the machine, said section being taken through the arms 49;

Fig. 15 is an enlarged end view of the arm 16, said view showing the head of the bolt 95 removed, said view also showing a portion of the track C; and Fig. 16 is a vertical longitudinal section taken on line 16—16 of Fig. 15.

Referring to the drawings in detail, and particularly Figs. 1 and 2, a base member is shown which consists of a lower section A and an upper section B. Both sections are cylindrical in shape and are united by an annular flange 2 welded on or otherwise secured to the upper end of the lower section and by bolts 3. A cross member 4 in the form of a plate or spider is secured in the lower base section and a similar cross member 5 is secured in the lower end of the upper section. Bearings 4a and 5a are formed in the respective cross members, and extending through said bearings is a vertically disposed shaft 6, the upper end of which is provided with a stud bolt 7 and a nut 8 to receive and secure the hub 9 of a propeller, the blades 10 of which are to be machine finished.

The machining is in this instance done simultaneously on all the blades of the propeller by groups of milling cutters, one group for each blade, and as each group of cutters remain in a fixed position while cutting, it is necessary not only to rotate shaft 6 together with the propeller secured thereon, but also to impart vertical movement to the shaft and propeller. Hence, both vertical and rotational movement must be controlled.

Vertical movement is controlled by means of a track generally indicated at C (see Figs. 1, 2 and 3). This track is mounted in the lower half A of the base and extends substantially half way around the same (see Fig. 3). The track is made of a plurality of thin strips of steel to render it flexible. Bolts 11 extend through the track and slots 12 formed in the base member A, and these slots are of sufficient length to permit the track to assume different angular positions depending upon the pitch of the propeller to be machined. By referring to Fig. 4, it will be noted that lines 14 are formed on the exterior surface of the base A, and that these lines assume different angles. These different angles indicate different pitches, and when the track is adjusted, it is lined up with a line of particular pitch and the track is then secured by applying nuts 15 to the bolts 11.

A pair of arms 16 and 17 are secured to the shaft 6. These arms are connected by a vertical arm 18 and arm 16 is extended to form a support for a roller 19 and as this roller rests on and engages the track C, it is obvious that if rotational movement is imparted to shaft 6, the shaft and the propeller secured thereto will move upwardly if the arms 16, 17 and 18 are moved in a counter-clockwise direction, and that the movement of shaft 6 and the propeller secured thereto will be in a downward direction if arms 16, 17 and 18 are rotated in a clockwise direction.

Rotational movement in a clockwise direction is imparted by gravity only. That is, shaft 6 together with the propeller represents considerable weight, and as this weight is supported by the arms 16, 17 and 18, and the roller 19, it is obvious that rotation will be imparted in a clockwise direction as the roller will tend to roll in a downward direction on the incline or angularly disposed track.

Other means must, however, be provided for rotating the shaft 6 and the propeller in a counter-clockwise direction as the roller will then have to travel upwardly on the incline track. This counter-clockwise or upward movement is transmitted hydraulically (see Fig. 3) by a cylinder 20 in which is moved a piston 21. This piston carries a rack bar 22 and the rack bar meshes a spur gear 23 which is freely rotatable about shaft 6 and rests on top of the bearing 4a. One of the spokes of the gear 23 is extended and a vertically disposed roller 24 is journalled thereon. During rotation of the gear by the hydraulic means specified, in a counter-clockwise direction, roller 24 will engage the vertical arm 18, thus impart rotational movement to the arm 18 and the arms 16 and 17, and as these are secured to the shaft 6, it is obvious that the shaft and propeller will be rotated in a counter-clockwise direction and that said members will also move vertically as the roller 19 will travel in an upward direction on the incline track.

In order to actuate the hydraulic cylinder which imparts rotational movement in a counter-clockwise direction, it is essential that oil or a similar fluid medium be introduced to the cylinder to force the piston 21 in the direction of arrow a (see Fig. 3). It is also essential that the fluid flow be cut off and that exhaust or return of the fluid be permitted when the shaft and propeller are to be rotated by gravitational force only. To accomplish this, an actuating bar 25 is secured to the outer end of the rack bar 22 so as to travel in unison therewith. During gravitational rotation, the rack bar 22, piston 21 and the actuating bar 25 are returned from the position shown in Fig. 3 by a cable 26 passing over pulleys 27 and 28 and connected with a weight 29. During that period oil or fluid previously admitted to the cylinder is escaping or exhausting through pipe 30 into a tank 31 (see Fig. 1). When the return movement is substantially completed, a lug 32 secured on the actuating bar 25 engages a roller 33 secured on the upper end of a lever 34 and swings that lever from the angular position shown in Fig. 1 to an opposite angular position. This lever closes an electric switch, not shown, and this switch closes a circuit through an electric motor, generally indicated at 35. The motor 35 drives a gear pump 36 and the moment it starts operating, it sucks oil from the bottom of a tank 31 through pipe 37 and discharges it through pipes 38 and 39 into the rear end of the cylinder 20. As the oil enters under pressure, piston 21 is forced forwardly in the direction of arrow a and the rack bar 22 will thus impart rotational movement to the gear 23, and the roller 24 carried thereby will then engage the arm 18, thus forcing the roller 19 upwardly on the incline track C and at the same time rotating and raising the shaft 6 together with the propeller. When the raising and rotating movement is substantially completed, a lug 40 carried by the actuating bar engages the roller 33 and returns the switch to the position shown in Fig. 1, thus breaking the circuit through the motor 35. The pump 36 then comes to rest and gravitational return of the parts is permitted as the oil will exhaust from the rear end of the cylinder 20 from pipe 30 back to the tank 31.

It will be noted by again referring to Fig. 1 that there is a valve 30a mounted on the pipe 30. This is a control valve and it restricts the return flow of oil from the cylinder 20 to the tank 31. By so restricting the flow, it controls the speed of rotation of a shaft 6 and the propeller during return gravitational movement. This is important as will hereinafter appear.

The main function of the actuating bar 25 is to automatically make and break the electric circuit through the motor 35. It, however, serves still another function, to wit that of automatically actuating an air valve generally indicated at 41 (see Figs. 3 and 5). In order to control the valve 41, a second lug 42 is provided. This lug engages the outer end of the stem of the valve 41 just a moment before the switch lever 34 is actuated by the lug 32 to break the circuit through the motor. When lug 42 engages the stem of the valve 41, it opens that valve and air under pressure delivered from a suitable source by a pipe 43 is thus permitted to pass through a pipe 44 which leads to the lower end of a cylinder 45. The purpose of this cylinder and the function it performs will hereinafter be described.

It was previously stated that one of the main purposes of this invention is to machine-finish the pressure surface of one or more blades of a propeller and it has been stated that milling cutters are provided for this purpose. There are three groups of milling cutters employed in order that all blades for instance of a three-bladed propeller may be machined at the same time, but obviously there may be more or less groups as conditions may demand. Inasmuch as the respective groups here shown are identical in construction and operation, the description of one group should suffice.

The construction and operation of one group of milling cutters can best be explained by reference to Figs. 1, 6, 7, 8, 9, 10 and 11. Secured by bolts 46 to the upper end of the top section of the base is a bracket 47. Pivotally mounted as at 48 on said bracket is an arm 49 and forming an extension of said arm is a lug 50 through which extends a bolt 51 which normally secures the arm 49 against pivotal movement. Formed in the lower face of the arm is a dovetail guideway 52 and slidably mounted in said guideway is a head member 53 which supports an electric motor 54. This motor drives a pinion 55 (see Fig. 8) which in turn drives a speed reducing gear 56 and this in turn drives four similar gears 57, 58, 59 and 60, the latter gear 60 driving an intermediate gear 61 which in turn drives a final gear 62. The gears 57, 58, 59, 60 and 62 are all secured on shafts indicated at 57a, 58a, 59a, 60a, and 62a respectively. These shafts are journaled in ball bearings 63 and 64 as clearly shown in Fig. 7. The ball bearings 63 are mounted in the head member 53 and the bearing 64 in the lower plate indicated at 65 which also functions as a cover plate to enclose the gears 55, 56, 57, 58, 59, 60 and 62 respectively, so as to exclude dust and moisture and permit proper lubrication. Each of the shafts 57a, 58a, 59a, 60a and 62a projects through the lower plate 65 and each has suitably secured thereon a milling cutter 66 and these are the cutters which engage and machine the pressure surface of the propeller blade or blades to be machined. In the present instance there are five spaced apart milling cutters carried by each head member, but more or less may be employed depending entirely upon the size of the machine, or the size of the propeller blades to be machined.

By referring to Fig. 7 a propeller blade is shown in cross section at 67; 68 indicates the leading edge of the blade, 69 the trailing edge and 70 the pressure surface to be machined.

In actual practice when the shaft 6, together with the propeller to be machined, assumes the upper position, the leading edge of a blade will be elevated to a point where it is slightly above the cutting edge of the cutters 66, or will in other words assume the dotted line position indicated at 71 in Fig. 7. In that position all of the cutters will be substantially parallel to the leading edge of the blade to be machined, and when gravitational movement commences, the blade will move against the cutters and the cutters commence cutting into the surface of the metal. In order that the cutters shall not be overloaded, the speed of the cutting operation is controlled by the valve 30a as previously described. As propellers of different size and weight may be mill-finished on this machine, it is also desirable to control the speed of vertical lift of the shaft 6 and the propeller mounted thereon. That is, if a large heavy propeller has just been finished and removed from the machine, and a small light-weight propeller is placed in position on the upper end of shaft 6, it may be found that the vertical or return movement is too fast. If this is the case, the return or upward movement may be slowed down to a desirable speed by merely adjusting a bypass valve indicated at 30b. In other words, valve 30a controls gravitational or downward movement of the propeller and shaft, while the valve 30b will control return of upward movement. Inasmuch as there are five milling cutters on each head, and as a blade to be machined moves towards the cutters and is at the same time rotated and lowered, it is obvious that five spaced apart cuts will be made crosswise of the blade. When those cuts are finished, it means that the shaft and the propeller supported thereby has reached the lowermost position. At that time lug 32 on the actuating bar 25 engages and throws the switch arm 34 to a position where it closes the circuit through the motor 35. Oil under pressure is thus delivered to the cylinder 20 and the shaft and the propeller are rotated and lifted vertically to assume a position for a new cut. Just as the uppermost position is assumed, lug 42 engages the stem of the valve 41 and air is thus admitted to the lower end of the cylinder 45. Briefly stated, when air is admitted to the cylinder, the head or heads supporting the cutters are advanced longitudinally, for instance one-sixteenth of an inch or whatever distance is desired so that when a second cut is made, that cut will be parallel to the first cut, but slightly advanced with relation thereto. In other words each successive cutting operation will overlap the first and when the blade is finally finished, a smooth machine finished surface will result. It will be noted by referring to Fig. 3 that the lugs 32, 40, and 42 are adjustably mounted on the actuating bar. This is desirable as the width of propeller blades vary, that is some are comparatively narrow and others wide. Inasmuch as rotational movement is less for a narrow blade than for a wide blade, it is obvious that by adjusting the lugs, a blade of any width may be machined without excess rotational movement.

The advance of the head or heads to cause successive cuts to overlap each other is accomplished as follows:

By referring to Figs. 1 and 10, it will be noted that a bracket 72a extends from the rear end of the head member 53 and that a cylinder 72 is secured thereto. This cylinder has a head 45 applied to its lower end to close it, but the upper end may be open. Pipe 44 connects with this head and admits air to the cylinder when the valve 41 is opened. This valve by the way is spring closed as shown when lug 42 moves out of engagement with the valve. Hence, it is only momentarily opened, but the time period is long enough to permit a sufficient volume of air to enter and force a piston 73 mounted within the cylinder to move in an upward direction. The piston carries a rack bar 74 (see Fig. 10) and this bar meshes with a spur gear 75 which is freely rotatable on a shaft 76. The gear is provided with a hub 75a on the exterior surface of which is formed ratchet teeth 77 (see Fig. 12). Keyed or otherwise secured to the shaft is a collar 78, and mounted thereon is a pawl 79. When air is admitted to the cylinder 72, and the piston 73 and the rack bar 74 move upwardly, gear 75 is rotated in a direction where it will engage the pawl 79 and thereby cause rotation of the collar 78, and as this collar is pinned or keyed to the shaft 76, the collar will rotate therewith. One end of the shaft is threaded as indicated at 76a and this extends through a nut 76b secured in the head member 53. Thus the head member is either advanced or retracted with relation to the hub of the propeller a predetermined distance when shaft 76 is rotated. In actual practice it has been found best to start the cutting operation so close to the hub of the propeller that the end or outermost milling cutter will not only engage the bladed surface of the propeller, but also the hub, thereby machining the exterior surface of the hub and the blade, hence, when the first cut has been made and the parts have been returned for a second cut, that is the time when the piston 73 moves upwardly and imparts rotation to the shaft 76 in a direction which causes it to retract the head member 53 the predetermined distance required. This distance can be nicely determined as a screw 80 extends through the bottom of the cylinder 72 and determines the lowermost position assumed by the piston 73. This, by the way, together with the rack 74, returns by gravity to a position where it will rest on the upper end of the screw 80 when the air is turned off as a bleeder valve is provided which is always open. When the piston and rack bar settle by gravity, gear 75 rotates freely about the shaft and the pawl becomes ineffective as the ratchet teeth rotate in a direction away from the pawl. It is only during the upward movement of the piston and rack bar that the ratchet teeth engage the pawl and thereby rotate the collar 78 and the shaft 76. Means are also provided for manually rotating the shaft 76, this means being a hand crank 81 which may be applied to the end of the shaft. When shaft 76 is to be rotated by the hand crank, the pawl is lifted and held in lifted position so that shaft 76 may be rotated in either direction without imparting movement to the gear 75 and the rack bar 74.

It was previously stated that the arm 49 which supports the head member 53 is provided with an extension 50 (see Figs. 6 and 10) through which pass the bolt 51 which normally secures the arm against movement. It was also stated that the arm 52 could pivot about the pin 48. Movement of the head about pin 48 may be imparted as the extension 50 is longitudinally slotted as shown at 50a and when it tilts, shaft 76 and cylinder 72 and all the mechanism actuated thereby tilts with it as the cylinder is secured to the bracket 72a, previously referred to. This bracket is of course secured to the outermost end of the arm 52, for instance as by means of bolts 52a. From the foregoing it should be clear that the milling cutters may be advanced longitudinally with relation to the arm 52 either automatically or by manual operation, and it should also be clear that the entire mechanism supporting the cutters and actuating the same may be tilted about the pivot 48. Such tilting action is only resorted to if the blades of a propeller are disposed on a rake slightly forward or rearward of a radial line. In most instances the propeller blades are disposed on a radial horizontal line and in that instance the mechanism will assume the position shown in Fig. 10.

There may be as previously stated (and there are in this instance) three groups of cutters operated by their individual motors 54, 54a and 54b. This is to take care of a three-bladed propeller. Inasmuch as there is only one mechanism, to wit the cylinder 72, the piston 73 and the rack bar 74, for imparting longitudinal movement to the head 53 and the milling cutters carried thereby, it is obvious that means must be provided for imparting motion to the other cutter supporting heads so that they will all move in unison when working on different blades. To accomplish this, special reference will be made to Figs. 13 and 14.

The milling heads driven by the motors 54a and 54b are indicated at 52a and 52b in Fig. 14. The arms in which the millling heads are mounted are indicated at 49a and 49b in Fig. 13 and the brackets supporting the arms are indicated at 47a and 47b. All of the brackets are identical. The arms and the heads which carry the milling cutters are identical and so is the drive from the motors to the milling cutters. The only difference is that the shaft 76 together with its actuating mechanism is eliminated from the heads 54a and 54b. A cable feed is substituted therefor, said cables being actuated by the head 53 when this is moved longitudinally in its arm 49 either automatically or manually. Four cables are employed and these are indicated at 85, 86, 87, and 88. Commencing with cable 85 (see Fig. 14) one end thereof is secured in a boss 85a forming a part of the head 53. The cable passes around a guide sheave 89 and then over a guide sheave 90, then over a guide sheave 91 and is finally secured as at 92 to one end and side of the head 52b. Cable 86 is secured to one side and one end of the head 53 at the point 93. It passes over the sheave 89 and the sheave 90 and then passes around sheave 91 and is finally secured to a boss 86a forming an extension of the head 52b. The cables 87 and 88 are similarly secured at one of their ends to the head 53 and at their opposite ends to the head 52a. Similar guide sheaves are employed as indicated at 89a, 90a and 91a. In order to fully understand how motion is transmitted from the head 53, for instance to the head 52b, let it be assumed that the hand crank 81 which actuates the head 53 is being rotated and that the head 53 is being moved longitudinally in its arm in the direction of arrow b (see Fig. 14), in other words outwardly. If that is the case, boss 85a will exert a pull on the cable 85 and as this is attached to the head 52b at the point 92, the head 52b will move outwardly a similar distance. Cable 86 which is attached to the head at the point 93 will also move outwardly with the head 53 and as its opposite end is secured to the boss 86a of the head 52b, that end will also move outwardly. In other words, the cable 85 is transmitting the motion when the movement of the heads 53 and 52b is outwardly and conversely cable 86 will transmit the motion if the direction or movement of head 53 is reversed. As the cables 87 and 88 are connected in an identical manner to the head 52a, it is obvious that all three heads will move in unison whether in an outward or an inward direction, and one, two or more blades on a propeller can thus be machined at the same time.

Inasmuch as this machine is particularly intended for machining the pressure surface of a propeller blade, for instance propellers which are made of cast iron, bronze or otherwise, it is well known that the blades may be thicker or thinner when the casting is completed even though made from the same pattern. This is due entirely to work done by the molders in a foundry. Some molders are more careful than others. Some compact the sand harder than others, and so on. Be that as it may, the blades vary in thickness as previously stated even though cast from the same pattern. In placing the propeller on the upper end of the shaft 6, washers may be placed between the upper end of the shaft and the lower end of the hub of the propeller as shown in Fig. 2 to take care of any variation in thickness, but this is not altogether satisfactory and other means are accordingly provided for compensating for such variations. For instance by slightly raising or lowering the shaft 6 with relation to the track C, such variations can readily be taken care of and that is the method employed in the present instance.

By referring to Figs. 15 and 16, it will be noted that the roller 19 which engages the track C is journaled on a pin 95 which is secured in the outer end of the arm 16. An adjustable arm 96 is pivotally mounted as at 97 on arm 16 at one side of the shaft 95. The arm 96 is longitudinally slotted and the free end is engaged by an adjusting screw 98. This screw is also carried by arm 16. By turning it in one direction it will raise arms 16, 17 and 18, and shaft 6 with relation to the track and by rotating it in an opposite direction, it will lower all of the propeller supporting mechanism with relation to the track. In order to rotate the adjusting screw, a sprocket gear 99 is secured on its upper end. A chain 100 passes around this sprocket and over a second sprocket 101 (see Figs. 2 and 3). A hand wheel 102 is mounted at the point shown and by rotating this, the adjusting screw is rotated so as to either raise or lower the shaft 6 as previously described. Thus, the leading edges of the propeller blades may be adjusted vertically so as to assume a desired position with relation to the milling cutters, and the overlap of the cuts taken thereafter may be adjusted by the screw 80 mounted in the cylinder 72 as previously described.

From the foregoing, it should be apparent that when a propeller with two or more blades is placed in position on the upper end of shaft 6 and secured thereto, that the pressure surfaces of the blades and the exterior surface of the hub will be cut by a series of milling cutters to a finished surface and that the surfaces on the several blades will be identical, as the several heads 52, 52a and 52b which carry the milling cutters moved in unison and are controlled by a single actuating mechanism. Crowding or overloading of the milling cutters while cutting is avoided by controlling gravitational return movement through means of the regulating valve 30a. Depth of cut is controlled by the adjusting screw 98 and the amount of overlap of cuts is controlled by the adjusting screw 80. The actuating bar 25 functions to automatically open and close the circuit through the motor 35 and also functions to automatically actuate the air valve 41, and as this is the case, the machine will function automatically from the time the first cut is made until all blades are finished, and then all the operator has to do is to bring the machine as a whole to a stop and remove the propeller. While the present machine is designed for multi-blade propellers, it is obvious particularly on large machines that only one blade will be machined at a time, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. In a machine of the character described, a rotatable and vertically movable support to receive and secure the hub of a multi-blade propeller, a second support for a power driven milling cutter, means for releasing said support to descend by gravity, and guide means for simultaneously imparting a rotational movement to the propeller support as it descends by gravity, said movement being equal to the pitch of the propeller whereby the leading edge of a blade on the propeller is moved against the cutter and a cut is made in the surface of the blade crosswise thereof.

2. In a machine of the character described, a rotatable and vertically movable support to receive and secure the hub of a multi-blade propeller, a second support for a power driven milling cutter, means for releasing said support to descend by gravity, guide means for simultaneously imparting a rotational movement to the propeller support as it descends by gravity, said movement being equal to the pitch of the propeller whereby the leading edge of a blade on the propeller is moved against the cutter and a cut is made in the surface of the blade crosswise thereof, means for lifting said support to releasing position thereof, and means controlled by said lifting means for moving the cutter longitudinally of the blade from end to end thereof so that successive overlapping cuts may be made, said overlapping cuts forming a true machined pitch surface over the entire surface of the blade.

3. In a machine of the character described, a support to receive and secure the hub of a multi-blade propeller, a plurality of groups of aligned power driven milling cutters, one group for each blade on the propeller, a support for each group of cutters and disposing the cutters on lines substantially parallel to the leading edges of the respective blades, means for simultaneously imparting vertical and rotational movement to the propeller support whereby the leading edge of each blade is moved against the aligned cutters and a plurality of cuts are made in the surface of each blade crosswise thereof, and means for simultaneously moving each group of colors longitudinally of the respective blades from the hub to the tip of the blades so that successive overlapping cuts may be made, said overlapping cuts forming a true machined pitch surface over the entire surface of each blade.

4. In a machine of the character described, a cylindrical shaped base member, a shaft supported in said base and disposed centrally thereof, said shaft being rotatable and vertically movable in the support, means for securing a propeller on the upper end of the shaft, an arm secured to the shaft, a roller on the arm, a flexible helical shaped track member supported by the cylindrical base, said roller riding on the track and supporting the shaft and the propeller secured thereto, means adjustably securing the track to the base to permit the pitch of the helical track to be increased or decreased, and power actuated means for imparting rotational movement to the shaft and the propeller secured thereto to cause the arm and roller to travel upwardly on the helical track, said shaft arm and roller together with the propeller secured on the shaft being adapted to travel by gravitational movement downwardly on the helical track.

5. In a machine of the character described, a cylindrical shaped base member, a shaft supported in said base and disposed centrally thereof, said shaft being rotatable and vertically movable in the support, means for securing a propeller on the upper end of the shaft, an arm secured to the shaft, a roller on the arm, a flexible helical shaped track member supported by the cylindrical base, said roller riding on the track and supporting the shaft and the propeller secured thereto, means adjustably securing the track to the base to permit the pitch of the helical track to be increased or decreased, power actuated means for imparting rotational movement to the shaft and the propeller secured thereto to cause the arm and roller to travel upwardly on the helical track, said shaft arm and roller together with the propeller secured on the shaft being adapted to travel by gravitational movement downwardly on the helical track, and means for controlling the speed of the gravitational movement.

6. In a machine of the character described, a cylindrical shaped base member, a shaft supported in said base and disposed centrally thereof, said shaft being rotatable and vertically movable in the support, means for securing a propeller on the upper end of the shaft, an arm secured to the shaft, a roller on the arm, a flexible helical shaped track member supported by the cylindrical base, said roller riding on the track and supporting the shaft and the propeller secured thereto, means adjustably securing the track to the base to permit the pitch of the helical track to be increased or decreased, power actuated means for imparting rotational movement to the shaft and the propeller secured thereto to cause the arm and roller to travel upwardly on the helical track, said shaft arm and roller together with the propeller secured on the shaft being adapted to travel by gravitational movement downwardly on the helical track, and means for raising or lowering the shaft and the propeller secured thereon with relation to the helical track.

7. In a machine of the character described, a cylindrical shaped base member, a shaft supported in said base and disposed centrally thereof, said shaft being rotatable and vertically movable in the support, means for securing a propeller on the upper end of the shaft, an arm secured to the shaft, a roller on the arm, a flexible helical shaped track member supported by the cylindrical base, said roller riding on the track and supporting the shaft and the propeller secured thereto, means adjustably securing the track to the base to permit the pitch of the helical track to be increased or decreased, power actuated means for imparting rotational movement to the shaft and the propeller secured thereto to cause the arm and roller to travel upwardly on the helical track, said shaft arm and roller together with the propeller secured on the shaft being adapted to travel by gravitational movement downwardly on the helical track, and a power driven milling cutter engageable with one surface of the propeller blade during gravitational movement of the shaft and propeller.

8. In a machine of the character described, a cylindrical shaped base member, a shaft supported in said base and disposed centrally thereof, said shaft being rotatable and vertically movable in the support, means for securing a propeller on the upper end of the shaft, an arm secured to the shaft, a roller on the arm, a flexible helical shaped track member supported by the cylindrical base, said roller riding on the track and supporting the shaft and the propeller secured thereto, means adjustably securing the track to the base to permit the pitch of the helical track to be increased or decreased, power actuated means for imparting rotational movement to the shaft and the propeller secured thereto to cause the arm and roller to travel upwardly on the helical track, said shaft arm and roller together with the propeller secured on the shaft being adapted to travel by gravitational movement downwardly on the helical track, and a plurality of power driven milling cutters engageable with one surface of the propeller blade while said blade is rotating and moving downwardly by gravitational movement, said blade moving toward the cutters during gravitational movement.

9. In a machine of the character described, a cylindrical shaped base member, a shaft supported in said base and disposed centrally thereof, said shaft being rotatable and vertically movable in the support, means for securing a propeller on the upper end of the shaft, an arm secured to the shaft, a roller on the arm, a flexible helical shaped track member supported by the cylindrical base, said rollers riding on the track and supporting the shaft and the propeller secured thereto, means adjustably securing the track to the base to permit the pitch of the helical track to be increased or decreased, power actuated means for imparting rotational movement to the shaft and the propeller secured thereto to cause the arm and roller to travel upwardly on the helical track, said shaft arm and roller together with the propeller secured on the shaft being adapted to travel by gravitational movement downwardly on the helical track, a plurality of power driven milling cutters engageable with one surface of the propeller blade while said blade is rotating and moving downwardly by gravitational movement, said blade moving toward the cutters during gravitational movement, and means for controlling the speed of gravitational movement.

10. In a machine of the character described, a base, a shaft supported by the base, said shaft being vertically and rotatably movable in the support, a plurality of arms carried by the base and radially disposed with relation to the shaft, a milling head longitudinally movable on each arm, a plurality of power driven milling cutters carried by each milling head, power actuated means for intermittently imparting a step by step movement to one milling head, and means actuated by movement of said milling head for simultaneously imparting a step by step movement to the other milling heads.

11. In a machine of the character described, a base, a shaft supported by the base, said shaft being vertically and rotatably movable in the support, a plurality of arms carried by the base and radially disposed with relation to the shaft, a milling head longitudinally movable on each arm, a plurality of power driven milling cutters carried by each milling head, power actuated means for intermittently imparting a step by step movement to one milling head, and a plurality of cables connecting said milling heads with the other milling heads whereby the step by step movement of the first milling head is simultaneously transmitted to the other milling heads.

12. In a machine of the character described, a base, a shaft supported by the base, said shaft being vertically and rotatably movable in the support, a plurality of arms carried by the base and radially disposed with relation to the shaft, a milling head longitudinally movable on each arm, a plurality of power driven milling cutters carried by each milling head, power actuated means for intermittently imparting a step by step movement to one milling head, means actuated by movement of said milling head for simultaneously imparting a step by step movement to the other milling heads, and means for controlling the distance the milling heads are moved during each step by step movement.

13. In a machine of the character described, a base, a shaft supported by the base, said shaft being vertically and rotatably movable in the support, a plurality of arms carried by the base and radially disposed with relation to the shaft, a milling head longitudinally movable on each arm, a plurality of power driven milling cutters carried by each milling head, power actuated means for intermittently imparting a step by step movement to one milling head, a plurality of cables connecting said milling heads with the other milling heads whereby the step by step movement of the first milling head is simultaneously transmitted to the other milling heads, and means for controlling the distance the milling heads are moved during each step by step movement.

14. In a machine of the character described, a base, a vertically disposed shaft supported thereon, said shaft being rotatable and vertically movable in the support, a helical shaped track supported by the base, an arm on the shaft, a roller on the arm engaging the track and supporting the weight of the shaft and the arm together with a propeller secured on the upper end of the shaft, a hydraulically actuated cylinder, a piston in said cylinder, means for transmitting movement of the piston to rotate the shaft so that the roller on the arm will travel upwardly on the helical track and thereby rotate the shaft and simultaneously impart upward movement thereto, an actuating bar connected with the piston and movable in unison with the piston, a helical driven motor, a pump driven thereby to deliver fluid to the hydraulic cylinder to actuate the piston, means on the actuating bar for breaking a circuit through the motor when the roller has travelled upwardly on the helical track a predetermined distance, said shaft together with the propeller and the arm supporting the shaft and propeller exerting sufficient weight to permit gravitational return movement of the roller, the arm and the shaft together with the propeller to a predetermined point adjacent the lower end of the helical track, a plurality of milling cutters engaging and cutting one surface of the blade on the propeller during the return gravitational movement, means on the actuated bar for closing a circuit through the motor to drive a pump and deliver fluid under pressure to return the shaft and propeller to its upward position on the helical track, and other means actuated by the actuating bar for advancing the milling cutters longitudinally of the propeller blade to be machined after each cut has been completed.

15. In a machine of the character described, a base, a vertically disposed shaft supported thereon, said shaft being rotatable and vertically movable in the support, a helical shaped track supported by the base, an arm on the shaft, a roller on the arm engaging the track and supporting the weight of the shaft and the arm together with a propeller secured on the upper end of the shaft, a hydraulically actuated cylinder, a piston in said cylinder, means for transmitting movement of the piston to rotate the shaft so that the roller on the arm will travel upwardly on the helical track and thereby rotate the shaft and simultaneously impart upward movement thereto, an actuating bar connected with the piston and movable in unison with the piston, a helical driven motor, a pump driven thereby to deliver fluid to the hydraulic cylinder to actuate the piston, means on the actuating bar for breaking a circuit through the motor when the roller has travelled upwardly on the helical track a predetermined distance, said shaft together with the propeller and the arm supporting the shaft and propeller exerting sufficient weight to permit gravitational return movement of the roller, the arm and the shaft together with the propeller to a predetermined point adjacent the lower end of the helical track, a plurality of milling cutters engaging and cutting one surface of the blade on the propeller during the return gravitational movement, means on the actuated bar for closing a circuit through the motor to drive a pump and deliver fluid under pressure to return the shaft and propeller to its upward position on the helical track, other means actuated by the actuating bar for advancing the milling cutters longitudinally of the propeller blade to be machined after each cut has been completed, and means for regulating the distance the milling cutters are advanced.

16. In a machine of the character described, a base, a vertically disposed shaft supported thereon, said shaft being rotatable and vertically movable in the support, a helical shaped track supported by the base, an arm on the shaft, a roller on the arm engaging the track and supporting the weight of the shaft and the arm together with a propeller secured on the upper end of the shaft, a hydraulically actuated cylinder, a piston in said cylinder, means for transmitting movement of the piston to rotate the shaft so that the roller on the arm will travel upwardly on the helical track and thereby rotate the shaft and simultaneously impart upward movement thereto, an actuating bar connected with the piston and movable in unison with the piston, a helical driven motor, a pump driven thereby to deliver fluid to the hydraulic cylinder to actuate the piston, means on the actuating bar for breaking a circuit through the motor when the roller has travelled upwardly on the helical track a predetermined distance, said shaft together with the propeller and the arm supporting the shaft and propeller exerting sufficient weight to permit gravitational return movement of the roller, the arm and the shaft together with the propeller to a predetermined point adjacent the lower end of the helical track, a plurality of milling cutters engaging and cutting one surface of the blade on the propeller during the return gravitational movement, means on the actuated bar for closing a circuit through the motor to drive a pump and deliver fluid under pressure to return the shaft and propeller to its upward position on the helical track, other means actuated by the actuating bar for advancing the milling cutters longitudinally of the propeller blade to be machined after each cut has been completed, means for regulating the distance the milling cutters are advanced, and means for controlling the speed of the gravitational return movement of the propeller and shaft while the milling cutters are cutting.

CLARENCE W. ALLEN.

REFERENCES CITED

The following references are of record in the file of this patent:

UNITED STATES PATENTS

| Number | Name | Date |
|---|---|---|
| 1,077,279 | Ito | Nov. 4, 1913 |
| 1,379,267 | Keller | May 24, 1921 |
| 2,318,865 | Johnson | May 11, 1943 |
| 2,323,528 | Faulhaber | July 6, 1943 |
| 2,355,812 | Martindell | Aug. 15, 1944 |

FOREIGN PATENTS

| Number | Country | Date |
|---|---|---|
| 160,999 | Germany | June 13, 1905 |
| 13,144 | Great Britain | May 31, 1910 |
| 402,768 | Great Britain | Dec. 1, 1933 |